United States Patent
Mandolini et al.

(10) Patent No.: US 8,777,632 B2
(45) Date of Patent: Jul. 15, 2014

(54) EDUCATIONAL SYSTEM FOR DENTAL PROFESSIONALS

(75) Inventors: James Mandolini, Tucson, AZ (US);
Owen Mortensen, Tucson, AZ (US);
Jason Webster, Tucson, AZ (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 311 days.

(21) Appl. No.: 13/006,012

(22) Filed: Jan. 13, 2011

(65) Prior Publication Data

US 2012/0021395 A1    Jan. 26, 2012

Related U.S. Application Data

(60) Provisional application No. 61/294,823, filed on Jan. 13, 2010.

(51) Int. Cl.
*G09B 23/28* (2006.01)

(52) U.S. Cl.
USPC ........................................................ 434/263

(58) Field of Classification Search
CPC ...................................................... G09B 23/28
USPC .......................... 434/262, 263, 350, 353, 356
See application file for complete search history.

(56) References Cited

U.S. PATENT DOCUMENTS

| | | | |
|---|---|---|---|
| 5,791,907 A * | 8/1998 | Ramshaw et al. | 434/262 |
| 6,431,875 B1 | 8/2002 | Elliott et al. | |
| 6,736,776 B2 * | 5/2004 | Miles | 600/300 |
| 6,847,336 B1 * | 1/2005 | Lemelson et al. | 345/8 |
| 7,011,528 B2 * | 3/2006 | Tweet et al. | 434/262 |
| 7,343,305 B2 * | 3/2008 | Benn et al. | 705/3 |
| 2003/0061070 A1 | 3/2003 | Kelly et al. | |
| 2004/0091845 A1 * | 5/2004 | Azerad et al. | 434/263 |
| 2005/0170323 A1 | 8/2005 | Jarrell et al. | |
| 2006/0019228 A1 * | 1/2006 | Riener et al. | 434/263 |
| 2008/0015418 A1 | 1/2008 | Jarrell et al. | |
| 2008/0131859 A9 * | 6/2008 | Berger et al. | 434/350 |
| 2008/0280280 A1 * | 11/2008 | Romer | 434/356 |
| 2009/0092955 A1 * | 4/2009 | Hwang | 434/263 |
| 2010/0035223 A1 * | 2/2010 | Shibui et al. | 434/263 |
| 2010/0092937 A1 * | 4/2010 | Jackson | 434/262 |
| 2010/0311028 A1 * | 12/2010 | Bell et al. | 434/263 |

OTHER PUBLICATIONS

International Search Report and Written Opinion mailed Jul. 8, 2011, PCT/US11/21103, 11 pages.

* cited by examiner

*Primary Examiner* — Sam Yao
*Assistant Examiner* — Robert P Bullington
(74) *Attorney, Agent, or Firm* — Kilpatrick Townsend Stockton LLP

(57) ABSTRACT

An education system is disclosed. Unique interactive interfaces can give a user random access to patient data while taking an examination. Examination formats can include an item sequence format, which prompts a user to select and order proper treatments. A treatment map examination format can prompt a user to select a treatment and where to apply it. A dental treatment map can be used to map treatments to teeth surfaces, and a course authoring tool can allow a user to create a course, examinations, and scoring metrics.

33 Claims, 18 Drawing Sheets

COURSE OUTLINE | Page 1 of 3

- Patient Information
- Medical History
- Caries Status and Risk Assessment
- Periodontal Examination Record
- Endodontic Record
- X-Ray Images
- Photographic Images
- Glossary

220

[ Close ] [ Full Screen ]

Medical History

Personal History
Occupation : Student
Substance Use : n/a
Sugared drinks/day : 3
Diet drinks/day : n/a
Other refined carbohydrates/day : 4

Patient History
Height : 5'6"
Weight : 160
Blood Pressure : 105/80
Pulse : 75

Family History
Any history of immediate family with heart disease, lung disease, diabetes, etc. : no
Age and health of mother : 41
Age and health of father : 36
Does either parent have dentures : no

210

|| Home ||

Item Sequencer

310 — Treatment Item Option A, B, C, D, E, F, G, H, I, J, k

320 — Form a treatment plan by dragging, dropping, and ordering 4 items from the right into this box Submit

Item Sequencer Scoring

Example 1 weighting: Items: 70%   Sequence: 30%

Example 1a

- ✓ High acid and carbohydrate intake
- Low dental IQ
- High-risk patient
- ✗ Soft enamel Example 1a
Items: 75% Correct =   Items: 52%
Sequence: 25% Correct =   Sequence: 7.5%
= 59.5%

Example 1b

- ✓ High acid and carbohydrate intake
- Low dental IQ
- Poor oral hygiene awareness
- ✓ High-risk patient Example 1b
Items: 100% Correct =   Items: 70%
Sequence: 50% Correct =   Sequence: 15%
= 85%

Example 1c

- ✓ High acid and carbohydrate intake
- ✓ Poor oral hygiene awareness
- ✓ Low dental IQ
- ✓ High-risk patient Example 1c
Items: 100% Correct =   Items: 70%
Sequence: 100% Correct = Sequence: 30%
= 100%

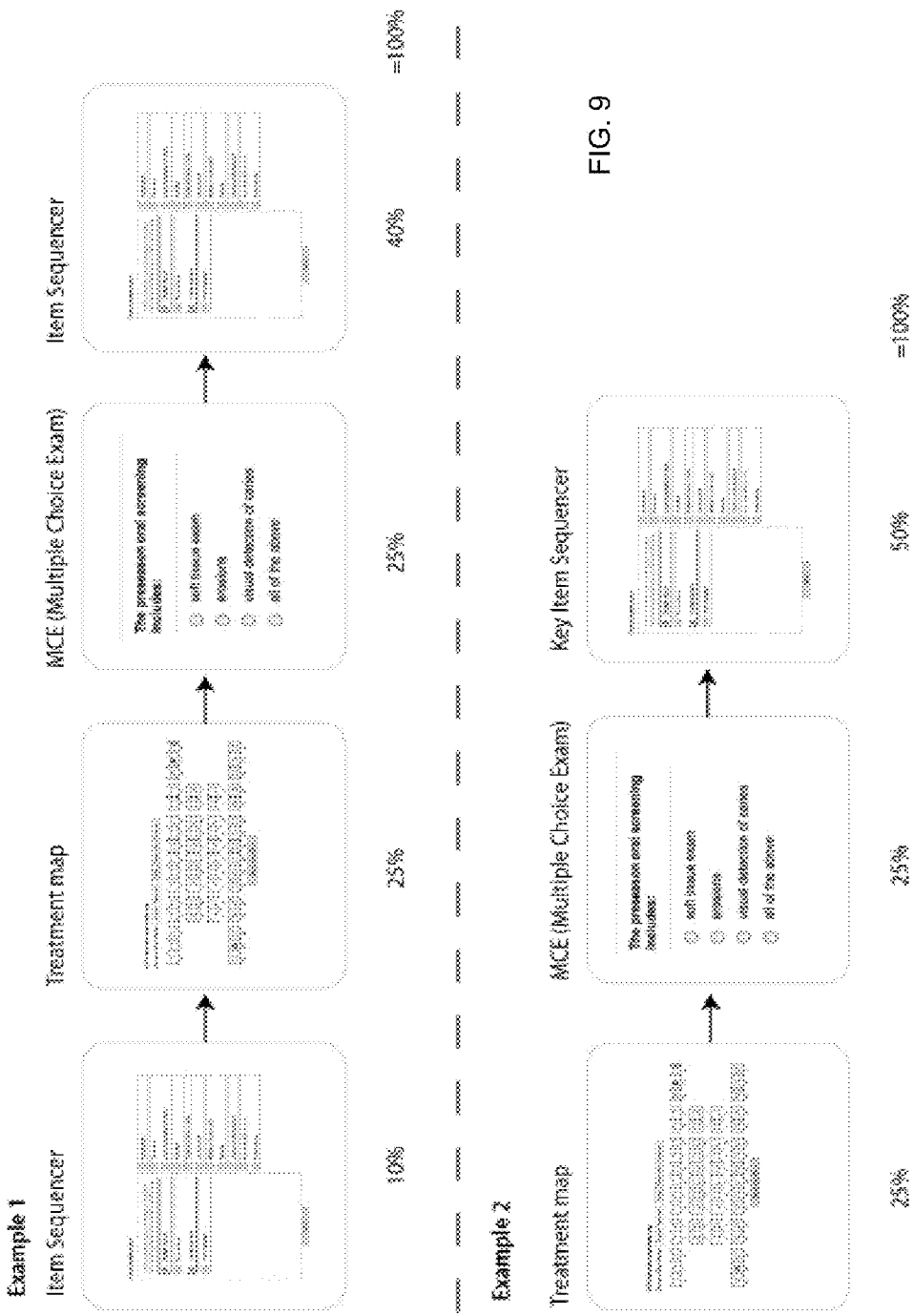

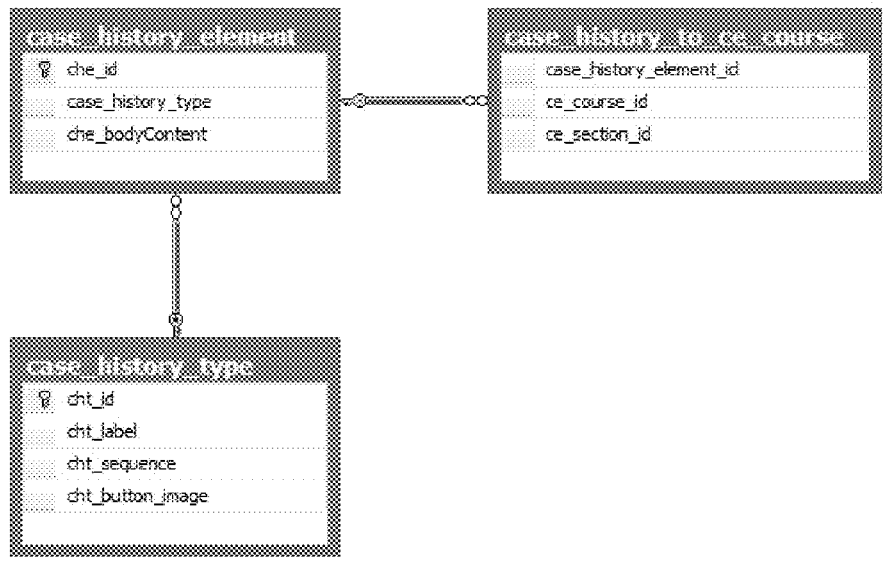

case_history_element – case history content

| Name | Type | Description |
|---|---|---|
| che_id | integer | unique identifier |
| case_history_type_id | integer | case_history_type.cht_id – case history type unique identifier |
| che_bodyContent | varchar(max) | The content of the case history. | case_history_type – type of case history

| Name | Type | Description |
|---|---|---|
| cht_id | integer | unique identifier |
| cht_label | varchar(120) | label (e.g. Patient Information, Medical History, Caries Status, Periodontal, Endodontic) |
| cht_sequence | integer | The default order in which they appear. | case_history_to_course – maps the case history menu to a course or a section of a course.

| Name | Type | Description |
|---|---|---|
| case_history_element_id | integer | case_history_element.che_id |
| ce_course_id | integer | ce_courses.cecourse_id – course unique identifier |
| ce_section_id | integer | ce_sections.cesection_id – section unique identifier |

FIG. 10

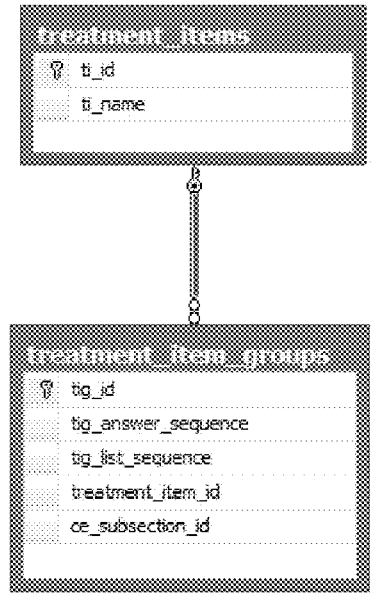

treatment_items – stores the list of treatment items. This is the library of treatment plans.

| Name | Type | Description |
|---|---|---|
| ti_id | integer | unique identifier |
| ti_name | varchar(120) | name of an item | treatment_item_groups – page of the test (ce_subsection_id), items to be included in the test, the order of the items in the test, and the correct answer.

| Name | Type | Description |
|---|---|---|
| tig_id | integer | unique identifier |
| tig_answer_sequence | integer | The order of the correct answers. 0 = not an answer (confounder) |
| tig_list_sequence | integer | The order in the selection list, may not be 0. |
| treatment_item_id | integer | treatment_items.ti_id |
| tig_treatment_item_weight | integer | 0-100% |
| ce_subsection_id | integer | ce_subsections.cesubsection_id – page where this specific item sequencer test is displayed. |

FIG. 11 teeth_map – map of the teeth assigned to a page of the course

| Name | Type | Description |
|---|---|---|
| tm_id | integer | unique identifier |
| cesubsection_id | integer | ce_subsections.cesubsection_id – reference to subsections table (page the teeth_map is displayed) |
| tm_name | varchar | tooth map name | teeth_state – records the state of the mouth (starting, ideal, answer)

| Name | Type | Description |
|---|---|---|
| cn_id | integer | unique user_id |
| tm_id | integer | teeth_map.tm_id (reference to teeth_map). |
| teeth_id | integer | teeth.t_id |
| surface_id | integer | tooth_surfaces.tooth_surface_id (specific tooth surface) |
| treatment_id | integer | tooth_treatments.treatment_id (treatment applied) |
| ts_state_type | integer | 0=starting, 1=ideal, 2=answer |
| ts_answer_weight | integer | 0 – 100% | tooth_types – type of tooth (adult maxillary, adult mandibular, deciduous maxillary, deciduous mandibular)

| Name | Type | Description |
|---|---|---|
| tt_id | integer | unique identifier |
| tt_tooth_name | varchar(120) | name of tooth | teeth – groups and names teeth

| Name | Type | Description |
|---|---|---|
| t_id | integer | unique identifier |
| t_group_id | integer | group identifier |
| t_group_sequence | integer | order within the group |
| tooth_type_id | integer | tooth_types.tt_id |
| tooth_name | varchar(120) | name of the tooth (first molar, second bicuspid, center incisor, etc) |
| t_split | integer | 1 = split diagram for tooth, 0 = no split |
| t_identifier | char | tooth identifier (e.g. 1-32, a-k) |

FIG. 12B tooth_surfaces – all possible tooth surfaces

| Name | Type | Description |
|---|---|---|
| ts_id | integer | unique identifier |
| ts_name | varchar(120) | name of surface (Mesial, Occlusal/Incisal, Distal, Facial (labial or buccal), Lingual |
| ts_designation | char | designation of surface (M, O/I, D, F, I/b, L) | teeth_to_tooth_surfaces – assigning surfaces to a tooth

| Name | Type | Description |
|---|---|---|
| tooth_id | integer | teeth.t_id – identifier of the tooth |
| teeth_surface_id | integer | tooth_surfaces.ts_id – identifier of the tooth surface |
| surface_position | char | position – top, left, right, bottom, center, center_left, center_right | tooth_treatments – library of tooth treatments

| Name | Type | Description |
|---|---|---|
| tt_treatment_id | integer | unique identifier |
| tt_treatment_name | varchar(256) | name of treatment | tooth_treatments_to_teeth_map – mapping a treatment to be displayed on a teeth map.

| Name | Type | Description |
|---|---|---|
| tooth_treatement_id | integer | tooth_treatments.tt_treatment_id – identifier of the treatment |
| teeth_map_id | integer | teeth_map.tm_id – identifier of the teeth map |
| ttttm_sequence | integer | display sequence of the treatment |
| ttttm_treatment_weight | integer | 0-100% |

FIG. 12C

EDUCATIONAL SYSTEM FOR DENTAL PROFESSIONALS

BACKGROUND

The present invention relates generally to computerized educational tools and methods, and more specifically to an educational system for dental professionals.

It is common for educational systems to administer examinations by first presenting course material through a series of screens or pages, and then presenting a test following the course material. However, such linear presentation of teaching and testing materials may fail to capture realistic situations encountered in actual practice and fail to measure problem solving skills important for a professional in a real world environment, e.g., skills to apply procedures to an actual patient.

Furthermore, testing and scoring is traditionally presented in a true/false, multiple choice, or essay format. For advanced professionals, such as individuals practicing or learning dentistry, such testing formats may be insufficient and fail to measure the skill required to be a proficient practitioner.

Therefore it is desirable to provide new educational systems and methods.

BRIEF SUMMARY

Embodiments of the present invention provide methods and systems for computerized education. One embodiment provides a unique interactive online educational system with novel user interface characteristics for dental professionals. The educational system may comprise of elements distinct to dentistry. For example, some embodiments can be used by dentists, dental assistants, or dental professionals to learn dental terminology, to be tested on various facets of dental information, and to receiving training on how to administer best practices and methodology on a patient. In further embodiments, the educational system may be applied or extended to other fields, such as dermatology, radiology, etc. In other embodiments, the educational system may be applied to non-medical fields.

According to some embodiments, a user can have random access to patient data while taking an examination. The patient data may contain medical facts and patient history, and other data, such as height, weight, medical files, x-ray images, periodontal examination records, endodontic records, caries status, risk assessments, and photograph images. Random access can be provided via buttons or other selections objects, that may cause patient data to overlay over a testing area. The random access to patient data during the examination may better simulate real world scenarios where a dental professional has access to a patient files.

According to other embodiments, an examination may prompt a user to assemble or design a treatment plan by selecting one or a plurality of treatments (e.g. from a list of possible treatments) and organizing them in a specific order. In an example embodiment, the educational system provides interactive pages that prompt the user to drag treatment objects into a proposed treatment area to select the treatments to apply. The treatment objects may then be ordered in the list to imply a sequence in which to apply the treatments. In one embodiment, feedback is provided as to whether the selection of the plurality of treatments is correct and whether they are placed in a correct order. A score can also be provided that accounts for whether a selected treatment is correct and whether it is placed in a correct order. The score may be weighted to apply a variable weight to the selection and sequencing aspects.

According to other embodiments, an examination may prompt a user to select treatments for certain regions of specific teeth as displayed on a map of the mouth. A computer compares the selected treatments for the one or more regions to treatments specified in a reference response. The computer then determines a score based on the comparison. In various embodiments, the reference response can specify ideal treatments for specific regions of respective teeth, acceptable treatments for specific regions of respective teeth, and unacceptable treatments for specific regions of respective teeth. In one embodiment, selected treatments that match ideal treatments add to the score, and selected treatments that match unacceptable treatments detract from the score. In a further embodiment, not selecting ideal treatment regions may detract from the score. In an example embodiment, the educational system may allow a user to create exams, exam answers (reference responses), and provide a scoring/weighting metric for the tests.

A better understanding of the nature and advantages of the present invention may be gained with reference to the following detailed description and the accompanying drawings.

BRIEF DESCRIPTION OF THE DRAWINGS

FIG. 2 shows a screen of a dental educational tool illustrating an overlay of patient data accessed with a selection item according to embodiments of the present invention.

FIG. 3 shows a user interface for an item sequencer test according to embodiments of the present invention.

FIGS. 4A-4B shows a screen illustrating treatments from list placed into answer box according to embodiments of the present invention.

FIG. 6 shows an example of item sequencer scoring according to embodiments of the present invention.

FIG. 7 shows a screen illustrating a dental treatment map according to embodiments of the present invention.

FIG. 9 shows two examples of weighted scoring using multiple tests according to embodiments of the present invention.

FIG. 10 shows the database schema for the organization of the case history of a particular patient used in a section of a course according to embodiments of the present invention.

FIG. 11 shows the database schema for the organization of data for the item sequencer test according to embodiments of the present invention.

FIGS. 12A-12C shows the database schema for the organization of data for the treatment map test according to embodiments of the present invention.

DETAILED DESCRIPTION

Embodiments of the present invention may provide methods and systems for computerized education. In one aspect, an enhanced interactive online educational system is provided. First, the specification contains a short description of the invention and some of the unique interface concepts in the system. Later specification sections describe specific examination formats and their associated scoring techniques. Finally, the specification describes an authoring tool that allows a user to customize the tests and the database schema used to provide customization of the tests.

I. User Interface Characteristics

In some embodiments, the educational system may contain interactive pages. The interactive pages may facilitate more realistic and dynamic examination of user skills. In one embodiment, the interactive pages can be provided over a network (e.g. the Internet) and can be accessed via any standard web browser. In an example embodiment, a user may access the pages from a client computer with internet connectivity to a server. In an example embodiment, the user may use a passcode and/or username, which may be obtained by paying a fee, to access the pages. In another embodiment, the pages may be downloaded from the server (e.g. as part of a software bundle) and run locally on the client computer. In yet another embodiment, the pages are loaded locally (e.g. from a CD, DVD, or other storage device) onto the client computer to be run on a processor of the client computer.

A user accessible front-end can include a course presentation and a user interface, which can present interactive pages. These interactive pages may comprise of static and dynamic text and elements which may form the basis of an examination. The pages may also comprise of rich elements, including video and interactive elements. According to an example embodiment, the user interface may track and record the user interaction. For example, the interface may recognize when a user clicks a mouse button or scrolls over a certain element. Recognizing user interactions may be used for scoring purposes. In one embodiment, a separate user accessible front-end can also exist for instructors, teachers, and professors to provide the ability to monitor student testing progress and results and to provide administrator functions.

Figure 1:
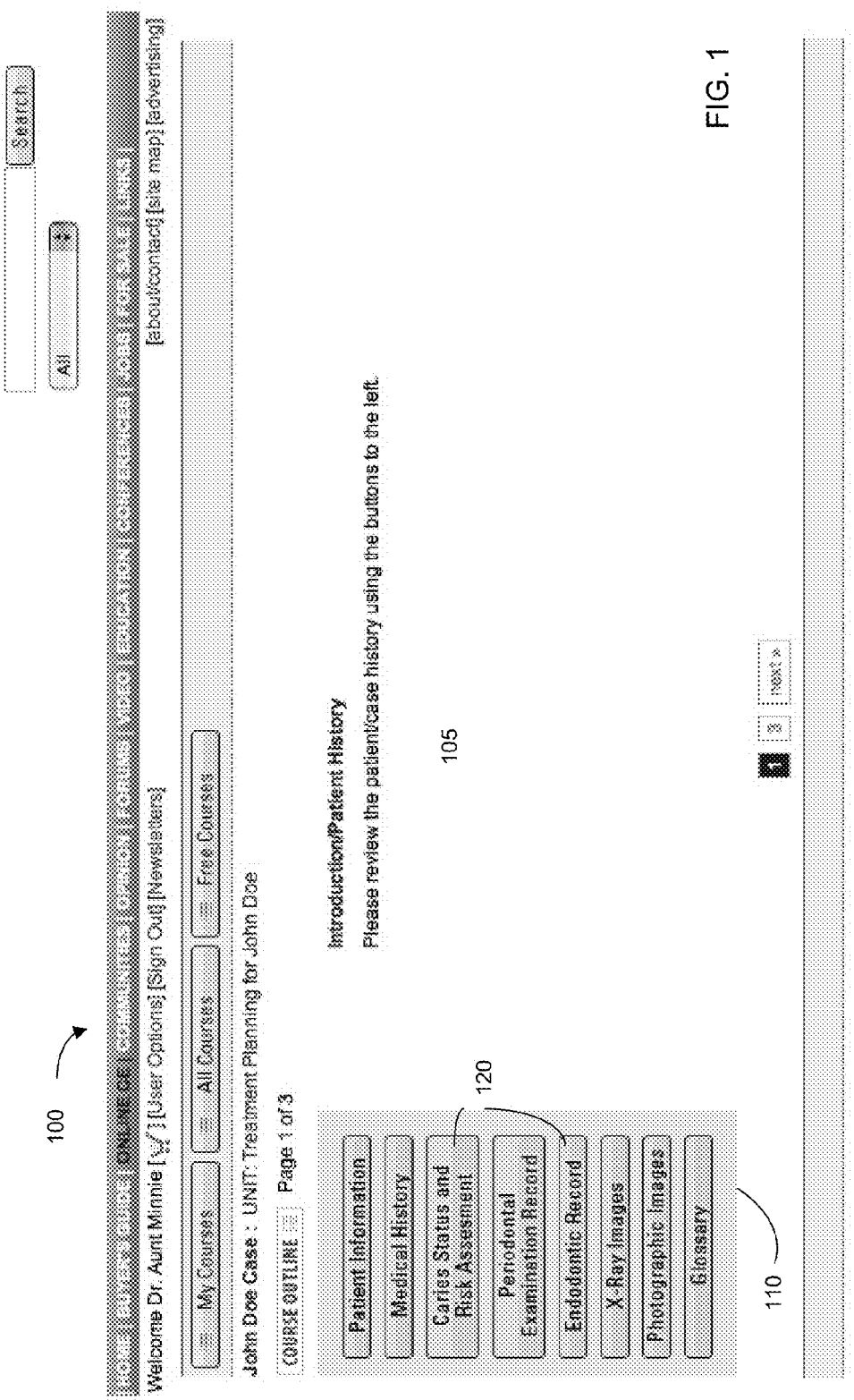
FIG. 1 shows a screen of a dental educational tool according to embodiments of the present invention.

FIG. 1 shows a screen 100 of a dental educational tool according to embodiments of the present invention. In one embodiment, screen 100 may be the first screen viewed after accessing the educational tool (e.g. having gained access by entering a passcode). In another embodiment, screen 100 can also follow other initial pages that contain introductory messages or coursework materials. For example, text, audio, and/or video can all be presented in these initial pages (as well as in screen 100 and pages following screen 100).

In one embodiment, screen 100 is the first screen of an examination section of a course. Note that a course can have many examination sections. Also, there may be more than one course available from the screen 100, such as free and courses available restricted to defined parties. The testing area 105 can be used to provide instructions, patient data, and examination related data. For example, the testing area 105 may display instructions for beginning the examination or various examination subsections. The testing area 105 can also provide a description, background, or other information about the topic being presented, including comments about one or more patients that are the subject of the examination section or subsection. The testing area 105 may also be where the user may provide input in order to take an examination.

During a section or subsection of an examination, a case history of one or more patients can be accessed. In one embodiment, on the left side of screen 100, a box 110 displays various selection elements 120 that refer to various types of patient data. The selection elements 120 and its respective patient data type may be selected by clicking on the selection element 120 (shown as a button), or via a tab, pull down list, scrolling over, or any other suitable selection mechanism or method. In one aspect, each selection element 120 and associated patient data may mirror data that would be found in a case file of an actual patient. For example, the selection elements 120 may be associated with patient information, medical history, caries status and risk assessments, periodontal examination records, endodontic records, x-ray images, photographic images, and a glossary of terms.

Screen 100 can appear on any computer screen. Herein, a computer screen is any display device that is communicably coupled (locally or through a network) with a processing device (e.g. a processor of a phone, tablet, notebook, or larger computer device).

FIG. 2 shows a screen 200 of a dental educational tool illustrating an overlay 210 of patient data accessed with a selection element 120 according to embodiments of the present invention. As shown, the medical history selection element 220 has been activated to provide an overlay of the medical history on top of the testing area 105 for easy reference. The overlay 210 of patient data may be presented over the testing area 105. The overlay may be closed to again display the information previously presented in the testing area 105 or may be expanded to fill the full screen. The overlay may be closed or dragged by clicking on or activating a "close" button. In an example embodiment, any of the selection elements 120 may be selected to display respective patient data or other data as an overlay 210. In an example embodiment, the patient data and selection elements may persist throughout a course. This may allow for a user to randomly access the patient data and to seamlessly return to the course. For example, at any point during a course a user may select a selection element and view patient data. In a further embodiment, selecting a selection element 120 may cause the patient data to be displayed in the testing area 105.

Such interactivity allows for referencing back to the patient data. The patient data may include any data related to the patient and may mirror data normally stored in a patient file. For example, patient data may include patient medical history, demographic data, immunization data, blood pressure, height, weight, x-rays, and other medical data useful to the prognosis of a patient. In an example embodiment, the x-rays may comprise of x-rays showing a patient's teeth.

In one embodiment, an authorization capability exists that allows teachers/administrators to create courses and examinations for each course. The authorization capability also allows the teachers/administrators to adjust permissions so that select defined users of the site are given access to student scoring.

II. Item Sequencer Test

One format of examination is an item sequencer test. In one embodiment, the item sequencer test comprises of two parts. A selection and ordering part, both of which may be tested using the same interface.

FIG. 3 shows a user interface 300 for an item sequencer test according to embodiments of the present invention. A purpose of the test is to have a user design a treatment plan for a patient. A treatment plan can be composed of a sequence of treatments (1st part) in a specific order ($2^{nd}$ part).

In the embodiment shown, a list 310 of possible treatments is displayed. These treatments may be created or uploaded by the teacher/administrator/course creator. Some of the possible treatments may be confounders (incorrect treatments).

This list may be displayed in any suitable manner, e.g. as separate boxes, in a drop down list, etc.

A first part of the test is selecting N items (treatments) from a list 310 of X items, wherein X is any integer greater than 1 and N is an integer less than X. In one aspect, there can be N correct items and X−N confounders items in the list. In FIG. 3, the N items (in FIG. 3, N=4) will be placed in the answer box 320 on the left. The X items are listed on the right (in FIG. 3, X=11). In one embodiment of scoring, the user can get credit for selecting any of the correct items from the list. The student may not get credit for selecting any of the confounder items, and may even lose points, as can be chosen by the creator of the exam. The N correct items can have different weights for scoring. For example, selecting a first item can provide a higher score than selecting a second item. In another embodiment, equal weights can be used. In a further embodiment, points may be lost if correct items are not selected.

In one embodiment, the test can request for a specific number of items to be put into the treatment plan. In another embodiment, the number may be left blank, and the user has to determine how many to provide.

In the embodiment shown, the user drags from the provided treatment list (right-most column 310) into the proposed treatment test area (center dotted area 320). For illustrative purposes, the treatments are simply labeled A-K here. In practice, typically each treatment would have a label related to the treatment being employed. A cross-referencing sheet could be used though so that labels A-K or other generic labels could be used.

A second part of the test is ordering the selected items. In the embodiment shown, the user can drop an item to the appropriate location (e.g. at the top or bottom order in box 320 or between two items). In other embodiments, the interface allows the student to rearrange the order of the items in any suitable manner. In an example embodiment, the order of the selected items may be represented spatially, such as top to bottom or left to right, etc.

Thus, according to various embodiments, the items can be selected in any number of suitable ways. For example, an item may be dragged and dropped into the box. An item may be selected and then activated (e.g. with another button or by a keystroke or mouse click) for placing into the treatment plan. In one aspect, the item can be placed at the top or end of the list, or after or before a highlighted item already in the plan). The order can then be changed by dragging or by a directional selection that moves an item up or down on the list. Thus, the treatments may be selected and ordered via any suitable mechanism, such as dragging and dropping, pull down lists, point and click, keyboard strokes to select an order number for a test, etc.

In one embodiment, the correct order of the items is weighted equally, while in other embodiments a correct order of one or more items can be weighted higher than other items. The student can lose percentage for each item that is out of order. For example, if half of the items are out of order, the student can lose 50% for the sequence part of the test. Scoring examples are described below in FIG. 6.

Figure 4A:
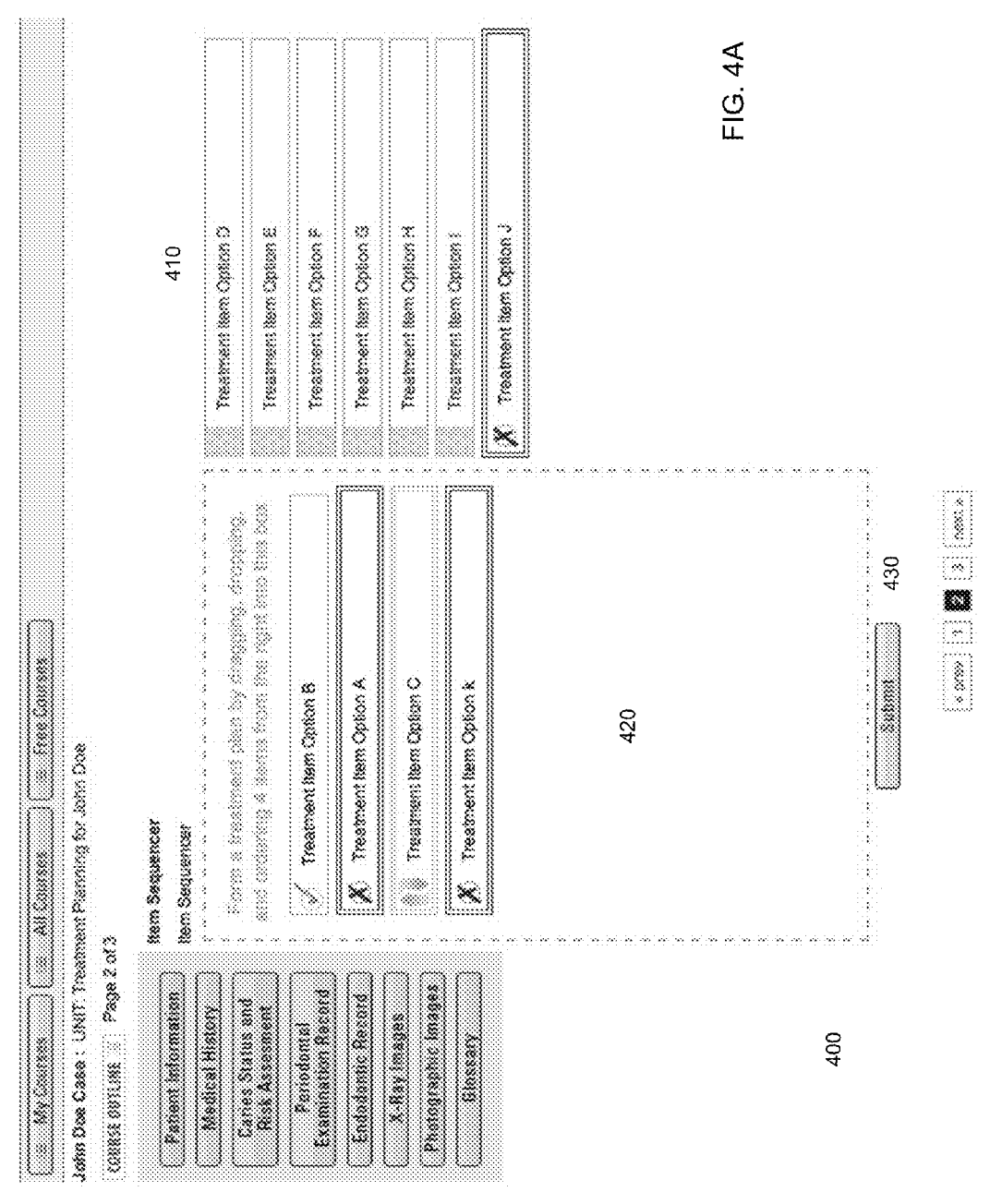

FIG. 4A shows a screen 400 illustrating treatments from list 410 placed into answer box 420 according to embodiments of the present invention. Once the user believes they have the correct treatments selected along with the correct order they can submit their answers. In an example embodiment, a user may click the "submit" button 430 to submit answers. In one embodiment, the system can provide instant feedback.

In one embodiment, the feedback may comprise of visual cues indicating whether the selected treatment was correct and if it was placed in the correct order. For example, a check mark may indicate correct treatment/correct sequence. A double arrow may indicate correct treatment/incorrect sequence. An X may indicate incorrect treatment. The system can also track and record each submission for monitoring user improvement. In a further embodiment, the feedback may be presented in text or visually via images.

In an example embodiment, visual cues can indicate one of the 3 conditions of an answer: (1) correct item/correct location relative to the proper sequence; (2) correct item/incorrect location relative to the proper sequence; (3) incorrect item (also called a confounder).

As shown, which condition applies can be provided by a status icon, such as checkmark, X, or arrows, which respectively convey correct, incorrect, and correct but wrong location. In another embodiment, the status of the selected treatment can be provided by color, e.g., green for correct, red for incorrect, and yellow for incorrect sequence. Other methods for displaying the correctness of answers may be used.

Figure 4B:
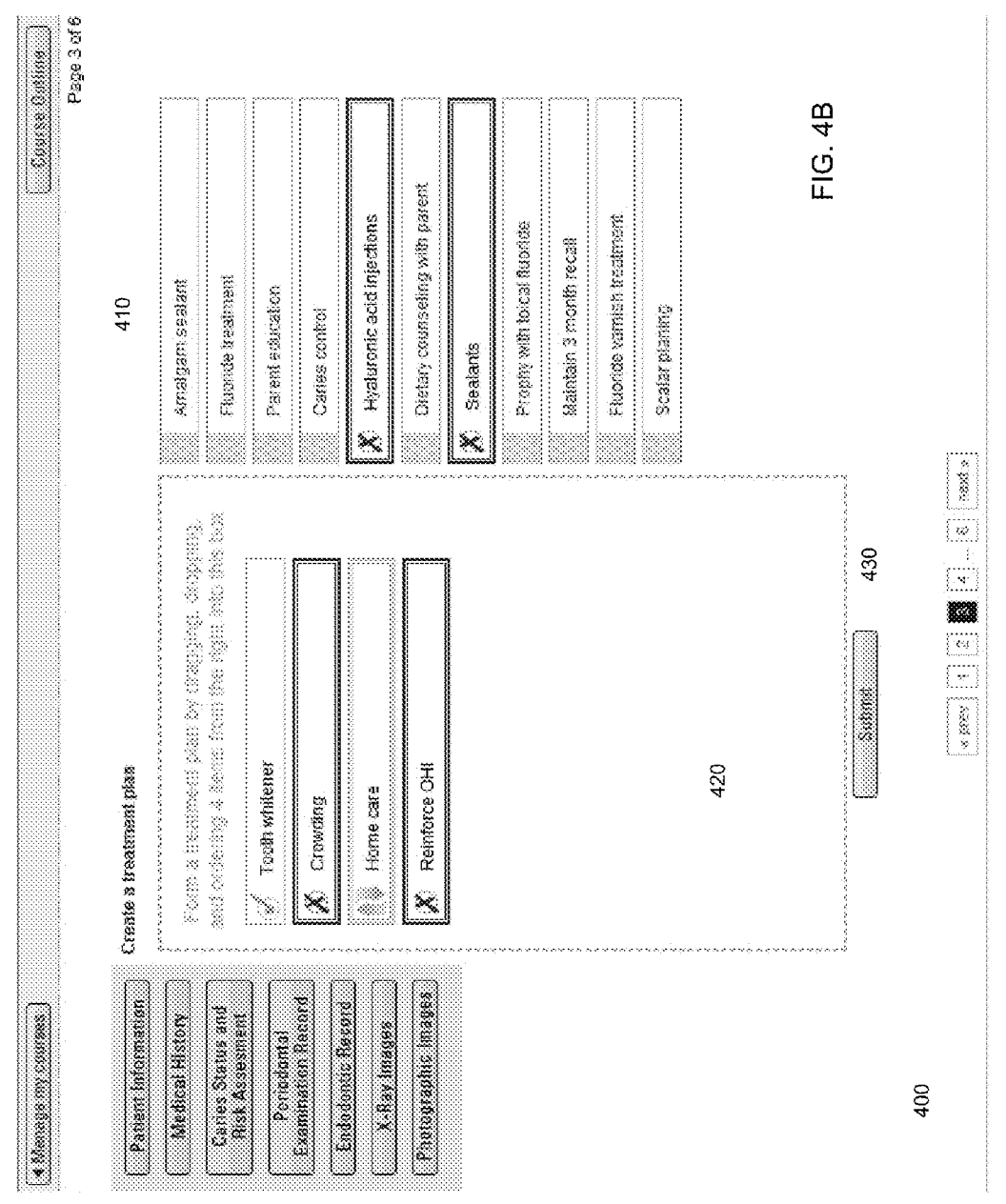

FIG. 4B shows screen 400 illustrating actual treatments from list 410 placed into answer box 420 according to embodiments of the present invention. In this example, the actual treatments are dental treatments such as fluoride treatment, sealants, etc.

In one embodiment, there may be more than one correct order and list of items. In embodiments where the number of treatments are not specified, there can be procedures that are optionally allowed to exist anywhere or in one or more specific locations. For example, a treatment plan may be allowed to exist between a $2^{nd}$ and $3^{rd}$ treatment, but is not required (essentially it is optional and does not affect the score), and if placed in another location is wrong.

The system can also track and record each attempt for monitoring the improvement of the user on each attempt to determine a proper treatment plan. This tracking can be performed across different courses or examinations. The system can prevent a user from moving on to a new test or preclude progress until it has been answered correctly. The scoring for the test can account for the number of attempts the user makes until the correct answers are obtained. Each attempt can have its own score (e.g. so many points for correct/item and more points if correct order is also obtained). Thus, the number and score of subsequent attempts may affect the final score for that examination.

As the user is determining the treatment plan (the $1^{st}$ time or on subsequent tries), the user can easily access patient information on the tabs to the left. These provide an overlay on top of the test. Having an overlay, instead of generating a new page, allows the treatment plan to be left intact and provides a more realistic testing environment. This can be important when the tool is being delivered through dynamic web pages (e.g. which can utilize code written with client-side scripting (dynamic HTML, Javascript, Flash) or server-side scripting (php, Perl, ASP, ASP.NET, JSP, ColdFusion)).

Figure 5:
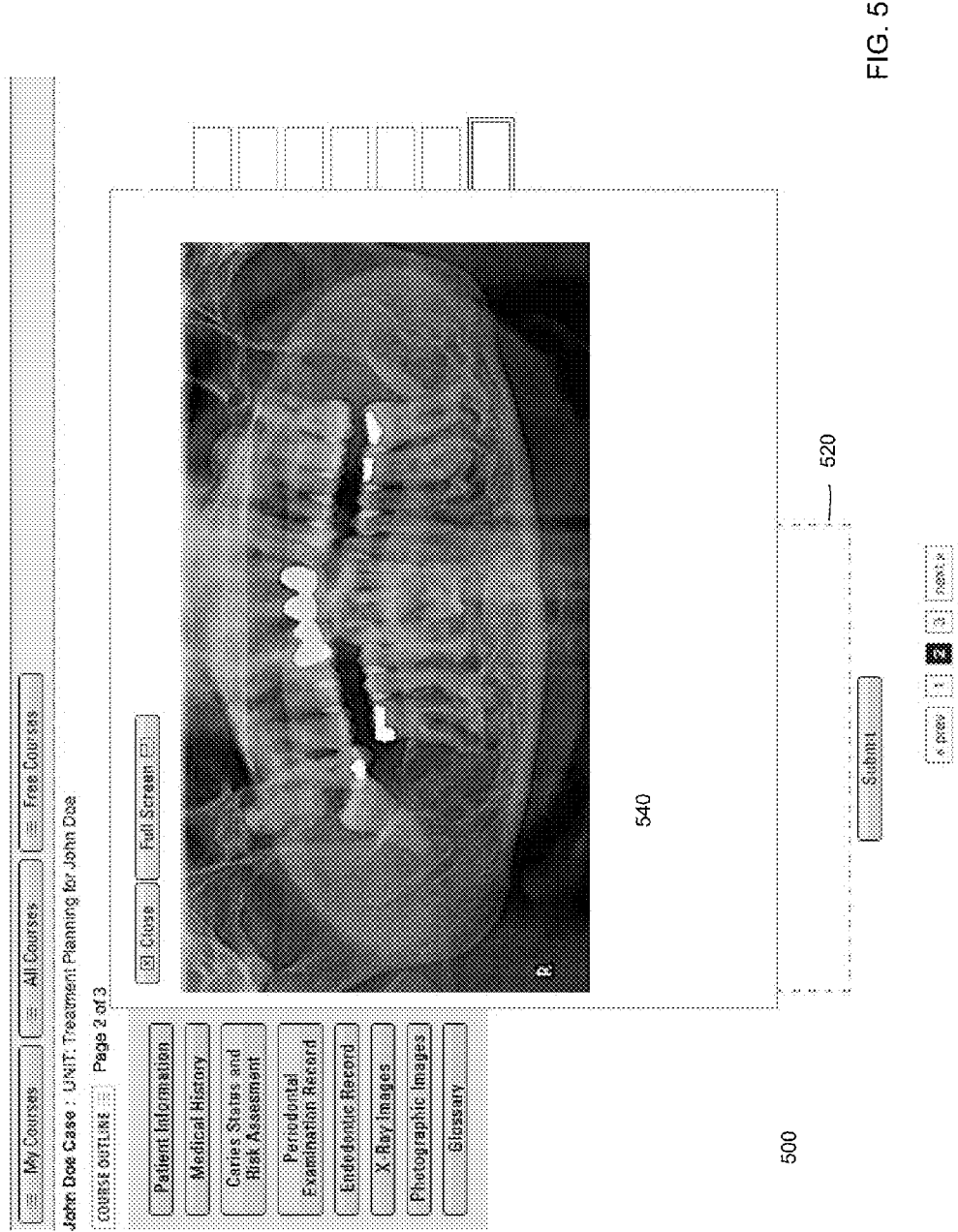
FIG. 5 shows a screen with an overlay of patient images over the treatment plan box according to embodiments of the present invention.

FIG. 5 shows a screen 500 with an overlay 540 of patient x-rays over the treatment plan box 520 according to embodiments of the present invention. Thus, a user can go back to a photographic image or an image in order to examine the dental information in order to make an assessment of the procedures to be performed. This situation reflects the real world situation where a dentist may examine an x-ray while deciding on a treatment plan. Such easy access to patient data allows for better testing of problem solving skills. For example, the need to memorize certain aspects of the file can be removed, and focus can be kept on the analysis of the data.

In one embodiment, the user can randomly access any part of the case file, which can provide for more efficient review of the data. The user can close the overlaid screen to immediately see the text or tests section underneath the overlay.

FIG. 6 shows an example of item sequencer scoring according to embodiments of the present invention. In one embodiment, each part of the item sequencer test can be weighted differently. For example, it may be more important to select the correct items than have the right order. In example 1a of FIG. 6, the treatment selection is given a weight of 0.7 while the treatment sequence is given a weight of 0.3. In an example embodiment, the sequence part of the test can be weighted to 0 so that there is no dependency on order and that 100% of the score is calculated from picking the correct items from the list.

Embodiments can allow a test to be iterative. For example, the student can continue to take this test until the correct solution is learned. In one embodiment, only the first answer is scored, while in other embodiments all of the answers may be scored and used to determine a final score. For example, each attempt can be stored, and a score may be derived by analyzing the many attempts it took the student to arrive at the correct answer.

In one embodiment, an item sequencer test designer can use an authoring tool to create the test. For example, an authoring tool can allow the designer to: Select the total number of items; Select the items (correct and incorrect items); Select the total number of items the student can choose for the test; Select the correct items; Select the correct order of the items; Add new items to the list of treatment items (e.g. list 310); Select the weight related to selecting the correct items; and Select the weight related to ordering the items correctly.

III. Treatment Map Test

Another type of examination is a treatment map test. The treatment map test can test the student's ability to perform a correct treatment based on information previously presented, such as patient data. The treatment map could apply to any type of treatment. In an example embodiment, a treatment map represents a physical object or objects upon which various treatments may be applied. In the following examples, a dental treatment map is presented.

Figure 7:
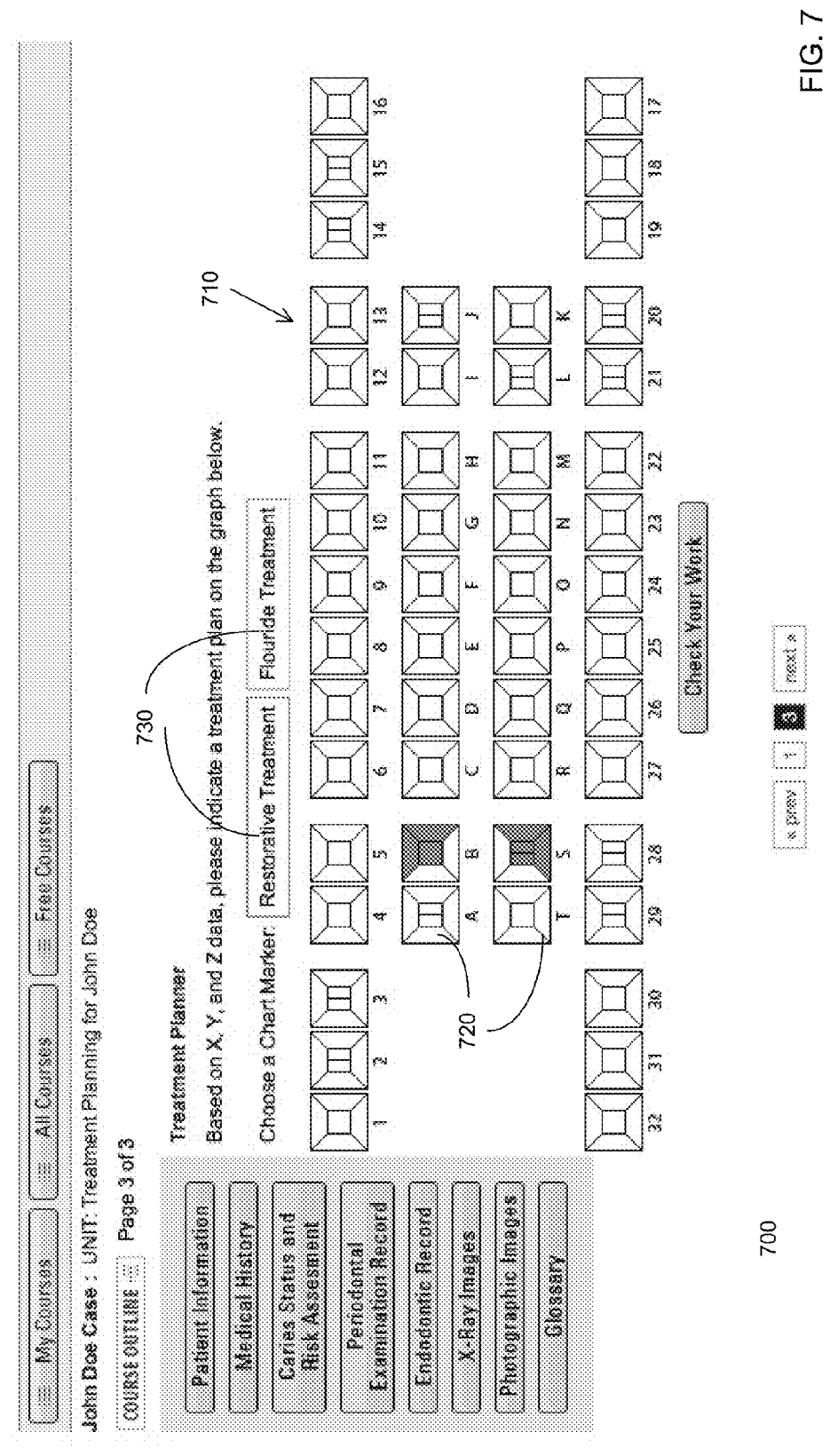

FIG. 7 shows a screen 700 illustrating a dental treatment map 710 according to embodiments of the present invention. This dental treatment map 710 is a map that represents each surface of each tooth in a mouth (e.g. a human mouth). Various dental treatment maps may exist, representing human dental development at various ages. The dental treatment map 710 is an interactive map that allows the user to apply treatments to the map, which may illustrate various surfaces of a tooth. The user can apply multiple treatments to the dental map. The map corresponds to a US standard, but other maps for other standards (e.g. ISO) may be used.

Each region 720 is associated with a particular surface of a respective tooth. In one embodiment, each region 720 is stored as a respective object in the database and can be displayed in any number of ways on a map. In other embodiments, a map providing depth (e.g. as part of a 3D map or just part of a 2D map) may be provided (e.g. for endodontic work). In an example embodiment, the region 720 may sections which represent each of four sides of a tooth and a section representing the top (occlusal or incisal surface) of a tooth. Other methods of displaying the treatment map may include 3D imaging, first person perspective exploration, and other methods. In other embodiment, the treatment map may represent other physical objects, such as skin on a person's face, or bones in a leg.

Based on the information presented in the course, the student can apply specific treatments to specific areas of the region 720 of the treatment map. In one embodiment, multiple procedures can be applied to the same region. In one aspect, this may be done with a treatment box that includes multiple procedures. In another aspect, this may be done by the user selecting separate treatment boxes and apply each procedure to the same region of the tooth. The student can be scored on how accurate he chooses and places the treatments relative to the answer key map (reference response).

In one embodiment, the student can click on a treatment 730 from a list (e.g. created from a library chosen in a database) and then click on the regions to apply the selected treatment. The region can be deselected, e.g., by clicking on the region again. Each treatment can have an associated color so that the student can track which treatments he/she has applied to which regions.

Specifically, FIG. 7 shows possible treatments, such as caries (dental cavity treatment), amlgam sealant, restorative treatment, fluoride treatment, and hyaluronic acid injections, that may be applied to the teeth for treatment. There may be any number of listed treatments, with some being applicable to the patient and some possibly being confounders. As shown, the user has selected to treat cavities at certain parts of tooth B and tooth S. In one embodiment, when the cursor is moved over a region the name of the region is provided (e.g. in a pop-up box).

In one embodiment, scoring the treatment map requires the treatment designer to create a treatment map answer key. In one example, on the treatment map answer key there are 3 types of regions: ideal, acceptable, and unacceptable.

Figure 8:
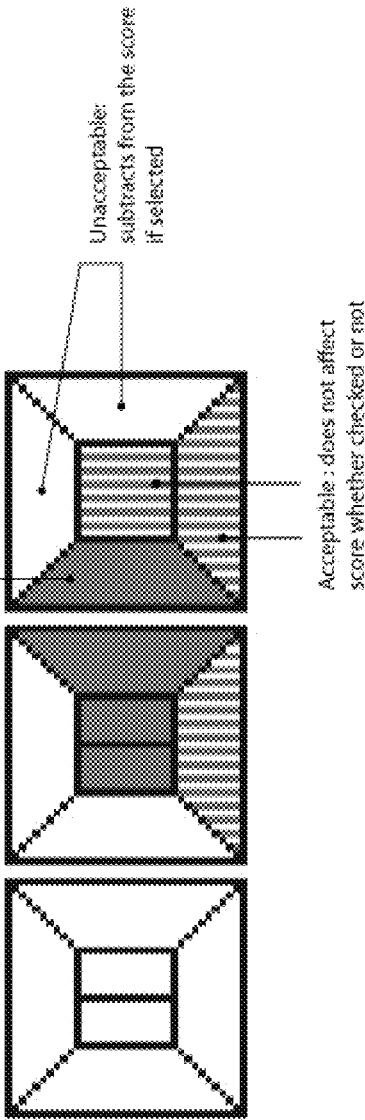
FIG. 8 shows an example of part of an answer key map (reference response) according to embodiments of the present invention.

FIG. 8 shows an example of part of an answer key map (reference response) according to embodiments of the present invention. In one embodiment, the ideal regions are areas where the treatment must be applied. The student must have marked these regions. If the student missed marking these regions, points are deducted. In another embodiment, points are added when a correct treatment is selected for an ideal region.

In one implementation, the acceptable regions can be areas where the treatment could be applied. This allows the answer key designer the make areas that do not deduct points when the treatment is applied (or deduct or add minimal points). In many professions there are differences of opinion when applying exact treatments. This allows the system to accommodate those scenarios where there are ambiguous "correct" answers.

In another implementation, the unacceptable regions are areas where the treatment should not be applied. The student will lose points for applying a treatment in these regions. The answer key designer can determine how many points the student looses for marking an unacceptable region.

In an embodiment, each treatment may be weighted differently. For example, applying treatment A may be more important than applying treatment B.

In various embodiments, the entire score for each treatment can be calculated by using any one or more of the following rules. Each ideal treatment can be weighted differently or the same. In one embodiment, the student starts with a score of 100% on each treatment map. For each individual treatment the student loses percentage points. Such lost points can be called "points lost per region." Examples of when a student loses points include marking an unacceptable region and missing an ideal region. Examples of scoring for two treatments and a total score are as follows:

Score of treatment 1=100%−(total # of unacceptable regions marked)*(points lost per region)−(total # of ideal regions missed)*(points lost per ideal region).

Score of treatment 2=100%−(total # of unacceptable regions marked)*(points lost per region)−(total # of ideal regions missed)*(points lost per ideal region).

Total score=(score of treatment 1)*(weight of treatment 1)+(score of treatment 2)*(weight of treatment 2).

This test can also be interactive and allow for multiple attempts. After each attempt, feedback may be given to highlight regions whose proposed treatment is incorrect. Feedback may also be given about what the correct score was and why, thus providing insight into why the answers were incorrect and why the reference was correct. For example, a procedure that could have side effects (e.g. allergic or other adverse reaction) could be described as a reason for a region being wrong.

In another embodiment, the score can start at zero or some common value less than 100% (or some number that is not a percentage), where unacceptable treatments subtract from the score and ideal treatments add to the score. For example, a score could start at 50 (percentage or points) and values could be added or subtracted. In one aspect, a final score could be greater than 100. In various embodiments, the final total scores can then be analyzed to determine a grading scale or set values can be used to determine passing.

In one embodiment, the document object model is used with Javascript and thus can work on multiple platforms and not require $3^{rd}$ party plug-ins. In another embodiment, Flash is used.

In other embodiments, a map of a different part of an organism (e.g. a human) may be used. For example, a full human body treatment map could be used, which divides up parts of the body into different treatment areas.

IV. Entire Course

The evaluation section can also include traditional online examinations: True/False, Multiple Choice, essay, etc. Each course can have 0 or more examinations during the course. The student can be scored on a total score calculated from all of the individual examinations. Each examination can have a different weight. One format of examination can be given multiple times in the course. In one embodiment, the student can be rewarded for making improvements during the course. One embodiment includes 3 types of examination: Item Sequencer, Treatment Map, and Standard.

FIG. 9 shows two examples of weighted scoring using multiple tests according to embodiments of the present invention. FIG. 9 shows a weighted scoring for each test in the course. There could also be more than one test of a certain type (e.g. multiple item sequencer tests). Weightings can be determined by the creator of the course (i.e. the person using the authoring tools). In example 1, there are four types of tests for the course, an item sequencer, treatment map, multiple choice exams, and another item sequencer, with respective weights of 10%, 25%, 25%, and 40%. In example 2, only three types of tests exist for the course, a treatment map, a multiple choice exam, and an item sequencer, with respective weights of 25%, 25%, and 50%.

V. Enhanced Online Education Authoring Tool

A course authoring tool can be used by the subject matter experts (teachers) to create and input patient cases as well as to create and author information used commonly across many cases. The teacher can also author lists of possible treatments for an examination, such as the treatment plan list. In one embodiment, the list can be chosen by selecting treatments from a library of treatments stored in a database. The course authoring tool may also be used to create answers and reference responses.

In one embodiment, the enhanced online education authoring tool is a web application used for managing and creating content for the enhanced online educational system. This tool enables authors to create a new course, develop all the content pages for the course, and create the evaluation\testing sections of the course.

The authoring tool can include the following functionality. It can create/edit the course information and allow input of information comprising author information, learning objectives, abstract, outline, references. These can be provided at the beginning of the course so that a user can know the purpose and basic materials of the course.

The authoring tool may also create/edit sections of the course. The author can divide the course into multiple sections, where each can have one or more tests at the end of a section. It can also create/edit specific pages of the courses, such as editing the specific text of the course and allow a user to add/remove images, sounds, slideshows, and videos from the page.

Other functionality includes the ability to create and edit the evaluations of the course. A user may thus create text related to a specific evaluation. For example, the text may be an introduction and description of the patient and the general scenario. They can also create specific item sequencer, treatment map, and standard examinations. A user may specify the weight of each individual examination in the course and determine if and how the results are reported and feedback is given to the user.

In supporting the creation of item sequencer examinations, the tool may allow a user to create and manage a library of items specific to the field of study, for example, the information of the case file, create the test instructions to display on the item sequencer test, for example the text in the display area, specify the correct answer, such as the correct order of the correct items to display in the list, specify the incorrect items to display in the list as confounders, assign a specific weight to the correct item choice, and assign a specific weight to the correct order of the items.

In supporting the creation of treatment map examinations, the tool may allow a user to build a treatment map for any map configuration, choose list of possible treatments, and select a map template (e.g. US, ISO). It may also provide a method for creating an answer key for each treatment map. This includes being able to specify ideal, acceptable, and unacceptable regions of the map. It may also allow the user to specify the amount of percentage points to deduct when a student chooses an unacceptable region and assign a specific weight to each treatment in a single test.

In supporting the creation of standard examinations, the tool may allow a user to create a multiple choice examination, create the list of answers, and choose the correct answers. A user may also use the tool to create a True/False examination, to create the question stem, and provide the correct answer.

For example, for the treatment sequencer scoring, the teacher can assign correct answers (including order), provide confounders, and submit the order that the possible treatments appear (defaults of alphabetical or random can be selected).

For the treatment map, the teacher can provide ideal treatments for each region, acceptable ones, and unacceptable ones. In one embodiment, just two (e.g. ideal and acceptable) of the three can be specified, where the rest of the possibilities are put into the third category.

For all sections of a course, the teacher can provide case history, upload images (e.g. photographic or x-ray), and upload other content such as audio and video. Each piece of information can be tagged as corresponding to a specific object in the database and have a specific label.

Buttons can be used to add and/or delete treatment (to map or sequence test) and location, and then answer can be saved. The teacher interface can be similar interface to the one that the user sees.

VI Enhanced Online Education Schema

In one embodiment, a database contains the course material such as the patient history and any material related to a patient case file used by a test. The database can contain a library of treatment plans (see treatment_items table in the schema description). The database can also contain general information (such as formatting and general content) that is used by all patient cases.

In one embodiment, the user accessible front-end reads and writes data in the database when the student performs actions. The database can also track the scores of the student (including a progressive scoring aspect). The course authoring back-end can also read and write data to the database.

The following is a database schema for one embodiment of the enhanced online education system.

Case History Tables

These tables can allow the patient case-history menu to be displayed on every page of the course or every page of certain course section. There can be different types of patient case histories, e.g., each type can have a different button type.

FIG. 10 shows the database schema for the organization of the case history of a particular patient used in a section of a course according to embodiments of the present invention. In one embodiment, for mapping the case history to a course, the variable ce_course_id tracks which course the case history belongs. In one aspect, this tracking can allow the database to be accessed by multiple courses. The code could also have the history location hardwired in (e.g. if the code was delivered on a CD and run locally), although some flexibility could be lost. In another embodiment, the variable ce_section_id tracks which section of a course the case history belongs. This may not be needed in embodiments where a course does not have multiple sections. In another embodiment, the variable case_history_element_id tracks which case history of a particular section of the course is being accessed.

For mapping the case history content, the course history element ID can be used to find the case history object. In one aspect, the case history object can have a specific type ID and also contain the content. The case history type defines how the case history content is displayed (e.g. labels, button image, and the sequence that each specific piece of content is displayed). The code for displaying the case history can use these variables so that the proper data is then retrieved and displayed in the proper manner.

Treatment Items and Sequence

FIG. 11 shows the database schema for the organization of data for the item sequencer test according to embodiments of the present invention. In one embodiment, for mapping an item sequencer test to a course page, the variable ce_subsection_id tracks the specific page of the course where the item sequencer test will be located. Various tables can be used. The treatment_items table can store a list/library of all the possible treatments or "items to treat" that can be included in the test. The treatment_item_groups table can contain all the items to be included in the item sequencer test on a specific page, Ce_subsection_id. In one embodiment, each row in treatment_item_groups is an item in the item sequencer test. The tig_answer_sequence can show whether the item is a correct answer. The tig_list_sequence can show the correct order of the item in the final sequence. The tig_treatment_item_weight can show the amount of scoring weight to apply to this item in the scoring.

Tooth Treatment Map Tables

Figure 12A:
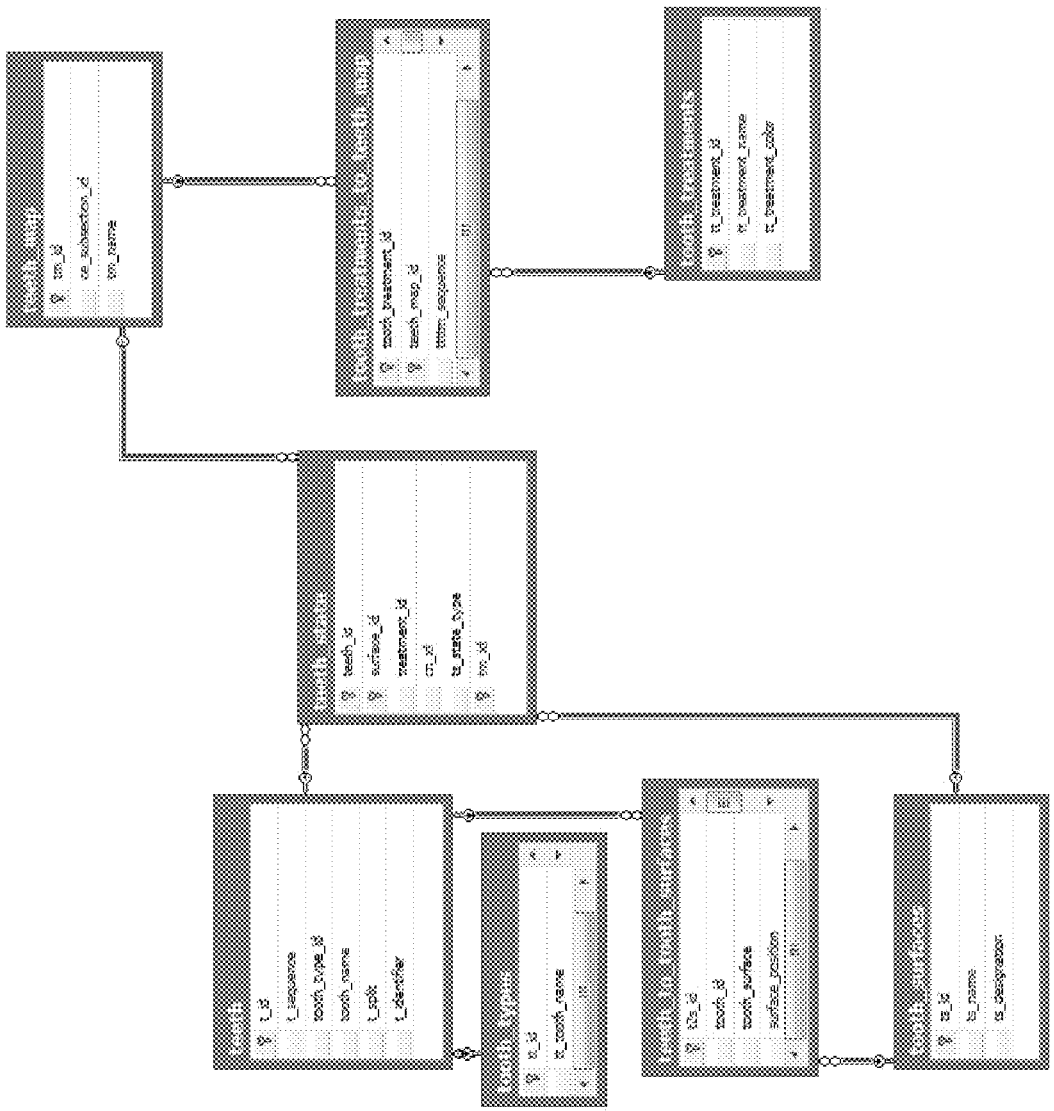

FIGS. 12A-12C shows the database schema for the organization of data for the treatment map test according to embodiments of the present invention. The following section describes how this example schema relates to generating a dynamic treatment map for any mouth configuration.

In one embodiment, for mapping a treatment map test to a course page, the variable ce_subsection_id tracks the specific page of the course where the treatment map test will be located. The teeth_map table can show this relationship tm_id to cesubsection_id. The variable tm_name may be used as a name given to the teeth_map. The tooth_types table can show the type of tooth (e.g. adult maxillary, adult mandibular, deciduous maxillary, deciduous mandibular).

In another embodiment, the teeth table stores all the teeth for a specific mouth representation. In one aspect, there can be one row per tooth in the mouth, where t_id is a unique identifier for the row and t_group_id is a unique identifier for the group of teeth. The variable tooth_type_id can relate the teeth table to the tooth_types table, and can store the specific type of tooth. tooth_name is the name of the tooth. The variable t_split can show whether to split the tooth in the diagram. For example, molars have the middle region split in the diagram. The variable t_identifier shows the standard identifier for the tooth (e.g. 1-32 for adult teeth, a-k for deciduous teeth).

In one embodiment, the tooth_surfaces table stores the name and designation of each possible tooth surface. The variable ts_name is the name of the surface (e.g. Mesial, Occlusal/Incisal, Distal, Facial (labial or buccal), Lingual), and ts_designation is the designation of the surface (e.g. M, O/I, D, F, i/b, L).

In some embodiments, the teeth_to_tooth_surfaces table stores all the surfaces for a tooth. This table connects tooth surfaces to a tooth. The variable tooth_id is the t_id from the teeth table (this identifies the tooth). The variable teeth_surface_id is the ts_id from the tooth_surfaces table. The surface position can define where the tooth surface is positioned on the tooth map (e.g. top, left, right, bottom, center, center_left, or center_right).

In other embodiments, the tooth_treatments table is a library of tooth treatments, a treatment that can be applied to a tooth surface. The variable tt_treatment_name is the name of the treatment. The tooth_treatments_to_teeth_map table can map a treatment to a teeth_map. The variable tooth_treatment_id is the tt_treatment id from the tooth_treatments table. The teeth_map_id is the tm_id identifier from the teeth_map table. The variable tttm_sequence is the sequence to display this treatment on the teeth map. The variable tttm_treatment_weight is the scoring weight associated with this treatment on this teeth_map.

The teeth_state table can store the state of the mouth for generating the answer key for a treatment map or for storing a student answer. This table can relate a teeth_map (Treatment map) to a specific treatment applied to a specific surface of the tooth. This can be used for creating an answer key or for storing a result. In one aspect, the table contains an entry for each surface of each tooth in the teeth_map (Treatment map) that has a treatment applied. The cn_id is a user id, the user who applied the treatment. The variable tm_id is the teeth_map (Treatment map). teeth_id is the id of the specific tooth where the treatment was applied. The variable surface_id is the surface on the tooth where the treatment is applied. The variable treatment_id is the treatment that is applied to the surface of the tooth. The variable ts_state_type is used for the answer key. The ts_state_type show whether this surface treatment is an ideal or acceptable answer. The variable ts_answer_weight is the weight that is applied to this specific treatment. It can also be used for the specific treatment on this specific surface.

These tables can uniquely specify both a layout and an order along with treatment options for any tooth system. In the United States, the teeth are identified by numbers (1-32) for adult teeth and letters (A-T) for deciduous teeth with 1-16 and A-J in the top row and 17-32 and K-T in the bottom row. However, any system for tooth layout could be represented. Additionally, any type of mouth (not just human) could be represented. Other aspects of embodiments may also be applicable to non-human mouths. For example, treatment plans of FIGS. 3-6 may be developed for non-human mouths.

Although described specifically for dental education, embodiments of the present invention can be applied to any discipline, e.g. dermatology, radiology, etc., or even to non-medical fields.

Figure 13:
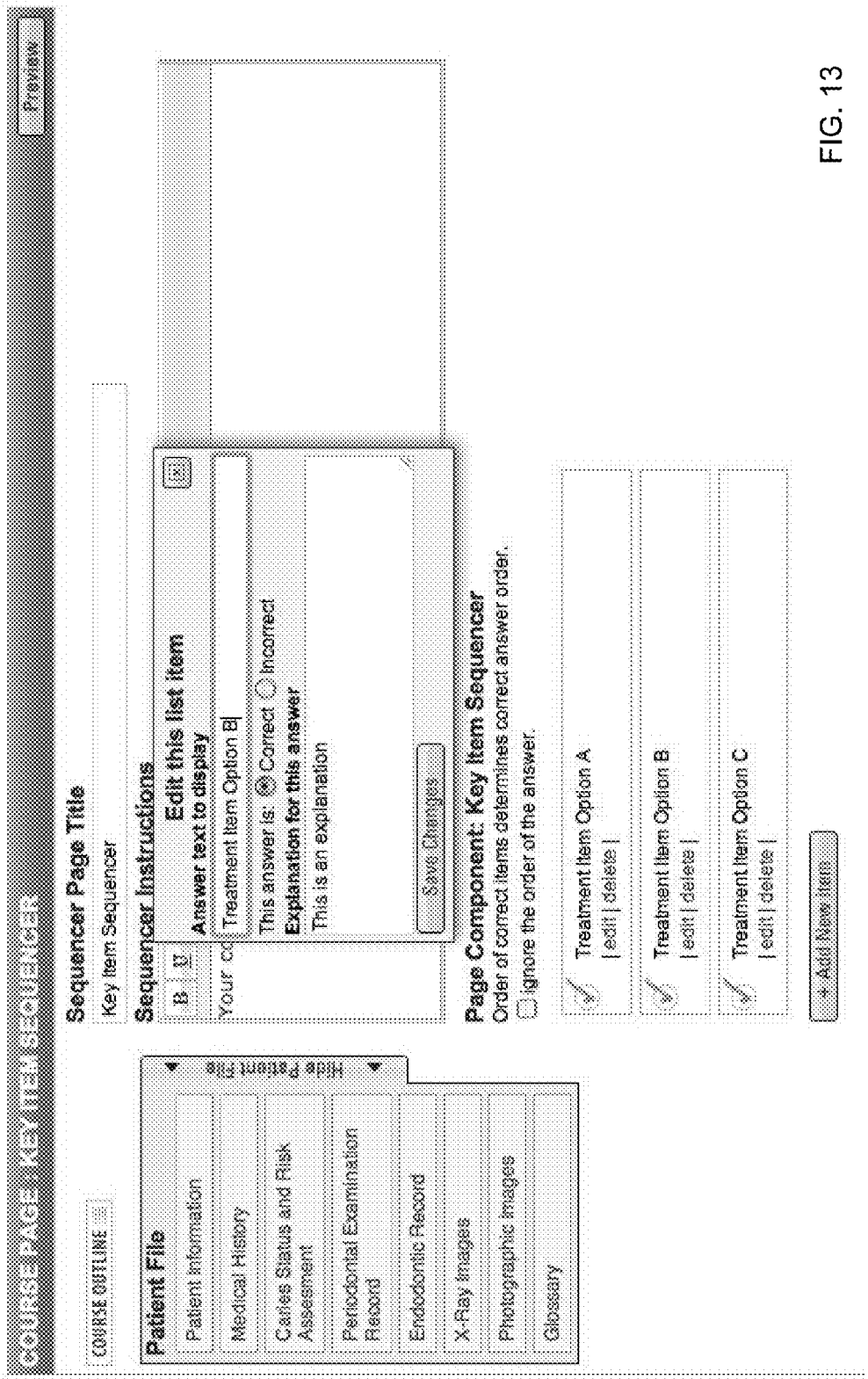
FIG. 13 shows a screenshot of an item sequencer test, according to an example embodiment.

FIG. 13 shows a screenshot of an item sequencer test, according to an example embodiment. In the screenshot, a user may be creating a item sequencer test. Text boxes may be shown for the user to enter a title for the sequencer page title and instructions. A section also exists for a user to identify the correct items and order them. A check box may indicate that the order of the items/treatments is to be ignored. A new item may be added to the sequence by clicking the "Add New Items" button.

Figure 14:
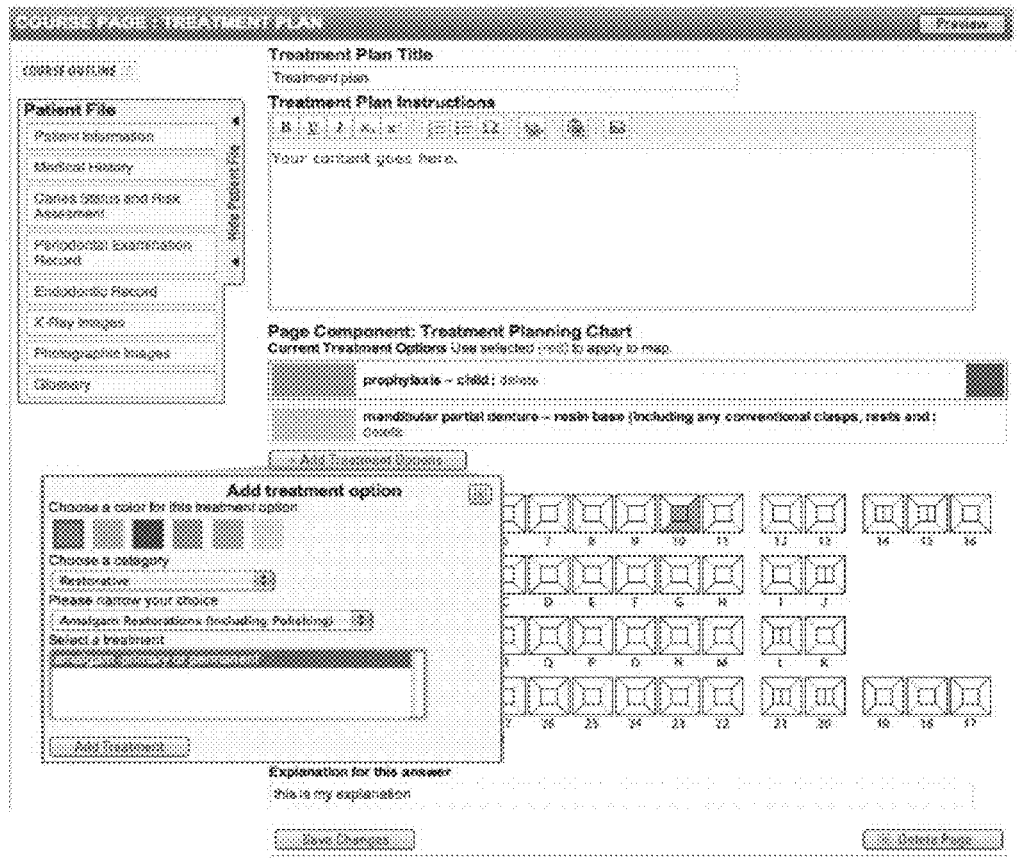
FIG. 14 shows a screenshot of a dental treatment map, according to an example embodiment.

FIG. 14 shows a screenshot of a dental treatment map, according to an example embodiment. In the screenshot, a user may be creating a dental treatment map. Text boxes may be shown for the user to enter a treatment title and instructions. A treatment map design component may allow a user to define colors and their relation to certain treatment, name particular treatments, and define where on the dental treatment map that treatments should be applied.

Figure 15:
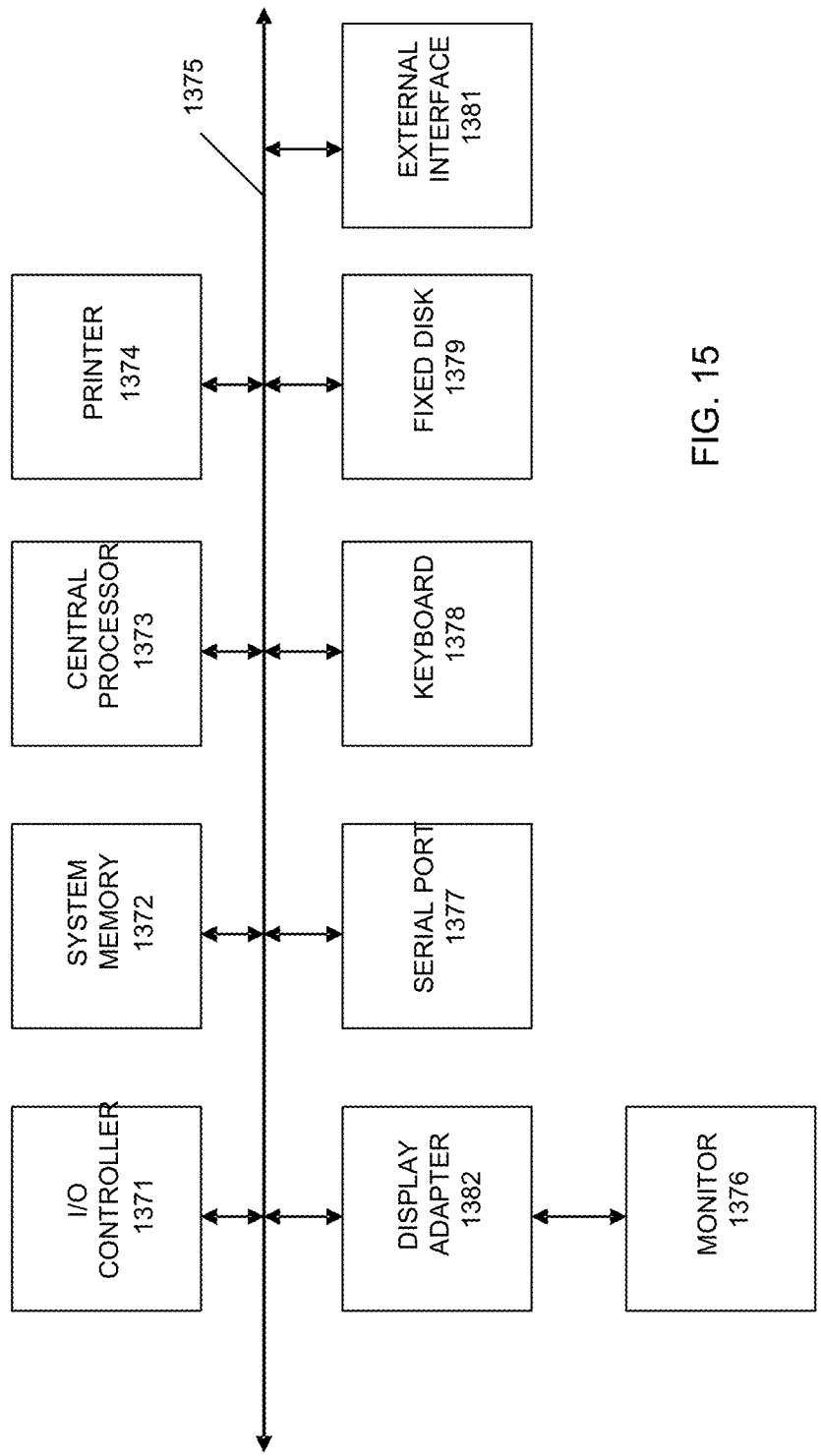
FIG. 15 shows a block diagram of an exemplary computer apparatus usable with system and methods according to embodiments of the present invention.

The educational system may utilize any suitable number of subsystems. Examples of such subsystems or components are shown in FIG. 15. The subsystems shown in FIG. 15 are interconnected via a system bus 1375. Additional subsystems such as a printer 1374, keyboard 1378, fixed disk 1379, monitor 1376, which is coupled to display adapter 1382, and others are shown. Peripherals and input/output (I/O) devices, which couple to I/O controller 1371, can be connected to the computer system by any number of means known in the art, such as serial port 1377. For example, serial port 1377 or external interface 1381 can be used to connect the computer apparatus to a wide area network such as the Internet, a mouse input device, or a scanner. The interconnection via system bus allows the central processor 1373 (which may be composed of one or more separate processors) to communicate with each subsystem and to control the execution of instructions from system memory 1372 or the fixed disk 1379, as well as the exchange of information between subsystems. The system memory 1372 and/or the fixed disk 1379 may embody a computer readable medium.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of displaying a test, the method comprising:
   displaying, on a display screen of a computer system, a list of possible treatments of the test to a patient;
   displaying, on the display screen of the computer system, an area for receiving a set of treatments of the list of possible treatments;
   receiving, by the computer system from a user, an ordered list of treatments comprising a treatment plan from the list of possible treatments, the ordered list of treatments received in the area, wherein the ordered list of received treatments comprises a first treatment and a second treatment;

determining, by the computer system, whether the first treatment or the second treatment is correct and is placed in a correct order;

determining, by the computer system, that the first treatment is correct but in an incorrect order in the ordered list relative to a proper sequence of treatments;

determining, by the computer system, that the second treatment is incorrect and in an incorrect location in the ordered list relative to the proper sequence of treatments; and displaying, on the display screen of the computer system, a first status indicating that the first treatment is correct but in an incorrect location in the ordered list relative to a proper sequence of treatments and a second status indicating that the second treatment is incorrect and in an incorrect location in the ordered list relative to the proper sequence of treatments, wherein the first status and second status are displayed simultaneously.

2. The method of claim 1, wherein the test is an examination for a dental professional and the treatments are dental treatments.

3. The method of claim 1, wherein the area receives the ordered list of treatments by the user dragging and dropping treatments from the list of possible treatments into the area.

4. The method of claim 1, wherein the status of each received treatment is displayed on an image of the received treatment.

5. The method of claim 4, wherein one or more of the statuses are displayed using colors on the respective image of the received treatment.

6. The method of claim 4, wherein one or more of the statuses are displayed using symbols on the respective image of the received possible treatment.

7. The method of claim 1, further comprising:
calculating a first score based on whether the ordered list of received treatments is correct and has a correct order.

8. The method of claim 7, wherein
the area receiving a second ordered list of treatments from the list of possible treatments;
calculating a second score based on whether the second ordered list of treatments is correct and has a correct order; and
calculating a final score based on the first score and the second score.

9. The method of claim 7, wherein calculating the first score includes:
determining whether each received possible treatment is correct and is in the correct order.

10. The method of claim 9, wherein a first percentage of the first score is based on the whether the correct treatments are received, and wherein a second percentage of the first score is based on whether the received treatments have the correct order.

11. The method of claim 1, further comprising:
prior to displaying the list of possible treatments, providing a library of treatments stored in a database; and
receiving, from an author, a selection of treatments from the library to display in the test.

12. The method of claim 1, wherein the list of possible treatments and the area for receiving the set of treatments of the list of possible treatments are displayed next to each other on the display screen.

13. The method of claim 1, wherein the treatment map includes a full jaw with all teeth in the mouth.

14. The method of claim 1, wherein the ordered list of received treatments further comprising a third treatment, and the method further comprising:
determining, by the computer system, whether the third treatment is correct and is placed in a correct order;
determining, by the computer system, that the third treatment is correct and in a correct location in the ordered list relative to the proper sequence of treatments; and
displaying, on the display screen of the computer system, a third status of which the third treatment is correct and in a correct location relative to the proper sequence of treatments.

15. A computer program product comprising a non-transitory computer readable medium storing a plurality of instructions for controlling a processor to perform an operation for providing a dental test, the instructions comprising:
displaying, on a display screen of a computer system, a list of possible treatments of the test to a patient;
displaying, on the display screen of the computer system, an area for receiving a set of treatments of the list of possible treatments;
receiving, by the computer system from a user, an ordered list of treatments comprising a treatment plan from the list of possible treatments, the ordered list of treatments received in the area, and the ordered list of received treatments comprising a first treatment and a second treatment;
determining, by the computer system, whether the first treatment or the second treatment is correct and is placed in a correct order;
determining, by the computer system, that the first treatment is correct but in an incorrect order in the ordered list relative to a proper sequence of treatments;
determining, by the computer system, that the second treatment is incorrect and in an incorrect location in the ordered list relative to the proper sequence of treatments; and
displaying, on the display screen of the computer system, a first status indicating that the first treatment is correct but in an incorrect location in the ordered list relative to a proper sequence of treatments and a second status indicating that the second treatment is incorrect and in an incorrect location in the ordered list relative to the proper sequence of treatments, wherein the first status and second status are displayed simultaneously.

16. The computer program product of claim 15, further comprising:
one or more processors.

17. A method of providing a dental test, the method comprising:
displaying, on a display screen, a treatment map, wherein the treatment map includes a plurality of teeth of a mouth, each tooth having a plurality of regions that are sectioned by lines on the treatment map, the lines representing sections of the teeth including each of the four sides of a tooth and a top of the tooth, and wherein the treatment map includes each tooth in the mouth;
displaying possible treatments that are selectable for applying to the regions of the teeth on the treatment map, the possible treatments including a first treatment;
receiving a selection of the first treatment from a user;
receiving a selection of a particular region of a first tooth for applying the first treatment;
comparing, via a processor, the selection of the particular region of the first tooth for applying the first treatment to a reference response, the reference response indicating whether the first treatment is to be applied to the particular region of the first tooth; and determining a score of the user response based on the comparison.

18. The method of claim 17, wherein the reference response specifies whether the first treatment applied to the first tooth is ideal or unacceptable.

19. The method of claim 17, wherein the reference response specifies whether the first treatment applied to the first tooth is ideal, acceptable, or unacceptable.

20. The method of claim 19, wherein unacceptable treatments subtract from the score, and wherein not having ideal treatments subtract from the score.

21. The method of claim 19, wherein unacceptable treatments subtract from the score, and wherein having ideal treatments adds to the score.

22. The method of claim 17, further comprising:

prior to displaying the possible treatments, providing a library of treatments stored in a database, wherein the selection of the first treatment is provided from the library.

23. The method of claim 17, wherein the possible treatments include caries, amalgam sealant, restorative treatment, fluoride treatment, or hyaluronic acid injections.

24. A method of providing a test, the method comprising:

receiving test information that includes a plurality of identifiers, wherein the plurality of identifiers include a first identifier that corresponds with a test and a second identifier that corresponds with case history data to be used for the test, wherein the test includes one or more questions and item choices;

accessing a database with the second identifier to identify a case history object;

identifying a third identifier associated with the case history object, the third identifier defining how case history content of the case history object is to be displayed;

displaying, by a computer system on a display screen, the test identified by the first identifier;

displaying, by the computer system on the display screen, a testing area for displaying the case history content and for receiving the selection of a treatment in the testing area;

displaying, by the computer system, a group of selection elements adjacent to the testing area on the display screen, wherein the group of selection elements and the testing area are displayed at a same time on the display screen;

receiving, by the computer system, user input selecting one selection element of the group of selection elements; and displaying, by the computer system, the case history content associated with the selected selection element, wherein the testing area and display of the case history content are generated by the computer system.

25. The method of claim 24, wherein the test is an examination for a dental professional and the treatment is a dental treatment.

26. The method of claim 24, wherein the treatment is received by a processor from a user over a network, the processor coupled with the display screen.

27. The method of claim 24, further comprising:

removing the case history data display in response to an activation of a close button, thereby revealing the testing area.

28. The method of claim 24, wherein the case history data associated with the selection comprises of medical history data, caries status and risk assessment data, periodontal examination record data, endodontic record data, X-ray images, and photographic images.

29. The method of claim 24, wherein the testing area is displayed through a browser that dynamically generates the display of the testing area.

30. The method of claim 24, wherein at least one of the plurality of identifiers is used to dynamically generate a treatment map for the layout to be used as the testing area.

31. The method of claim 24, wherein a fourth identifier in the plurality of identifiers tracks a specific page where the test is located.

32. The method of claim 24, wherein the definition according to the third identifier for how the case history content is displayed includes at least one of labels, button image, and a sequence that a specific piece of content is displayed.

33. The method of claim 24, wherein the test is an item sequencer test.

* * * * *